United States Patent
Paik et al.

(10) Patent No.: US 7,433,438 B2
(45) Date of Patent: Oct. 7, 2008

(54) VESTIGIAL SIDE BAND SYNCHRONIZATION SIGNAL DETECTION CIRCUIT

(75) Inventors: Won-Kyu Paik, Suwon (KR); Dong-Jo Kim, Suwon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 775 days.

(21) Appl. No.: 10/767,734

(22) Filed: Jan. 30, 2004

(65) Prior Publication Data

US 2004/0190668 A1    Sep. 30, 2004

(30) Foreign Application Priority Data

Feb. 5, 2003    (KR) .................. 10-2003-0007155

(51) Int. Cl.
*H04L 7/00* (2006.01)
(52) U.S. Cl. ...................... 375/367; 375/371
(58) Field of Classification Search ................. 375/354, 375/355, 362–365, 367, 368, 371; 348/521, 348/524
See application file for complete search history.

(56) References Cited

U.S. PATENT DOCUMENTS 6,504,578 B1 * 1/2003 Gu .............................. 348/521
2002/0024995 A1 * 2/2002 Kim ........................... 375/231

FOREIGN PATENT DOCUMENTS

KR    2001-0064521    7/2001

OTHER PUBLICATIONS

Korean Office Action with translation dated Dec. 14, 2004.

* cited by examiner

*Primary Examiner*—David B Lugo
(74) *Attorney, Agent, or Firm*—Harness, Dickey, & Pierce, P.L.C.

(57) ABSTRACT

A vestigial side band (VSB) synchronization (sync) signal detection circuit and method of generating a VSB sync signal is described. The circuit may include means for generating a first control signal related to sync signal generation, based on receipt of a selected one of an input first data signal and input second data signal, and means for generating a position signal containing information regarding positions of a next field sync and segment sync signals. The circuit may also include a correlator for generating a sign signal to determine a sign of the field sync signal, and a generator for generating a plurality of distinct types of sync signals based on the control signal, position signal and sign signal.

31 Claims, 7 Drawing Sheets

VESTIGIAL SIDE BAND SYNCHRONIZATION SIGNAL DETECTION CIRCUIT

PRIORITY STATEMENT

This application claims the priority of Korean Patent Application No. 2003-7155, filed on Feb. 5, 2003, in the Korean Intellectual Property Office, the disclosure of which is incorporated herein in its entirety by reference.

BACKGROUND OF THE INVENTION

1. Field of the Invention

The present invention relates to a synchronization (sync) signal detection circuit and method for generating a sync signal in a digital television receiver.

2. Description of the Related Art

In the digital television (DTV) field, research is underway into developing robust DTV receivers and digital set-top boxes. As a result, the Advanced Television SubCommittee (ATSC), which is an industry organization which sets standards for DTV components, has specified a vestigial side band (VSB) signal necessary for transmission of a DTV signal.

Reception of a terrestrial broadcast signal, which is a VSB signal with a carrier, is difficult for a multi-path DTV receiver. This difficulty leads to the desire for a robust multi-path receiving system capable of receiving terrestrial broadcast signals. To receive VSB signals, the system should exactly receive a field synchronization (sync) signal or a segment sync signal.

Figure 1:
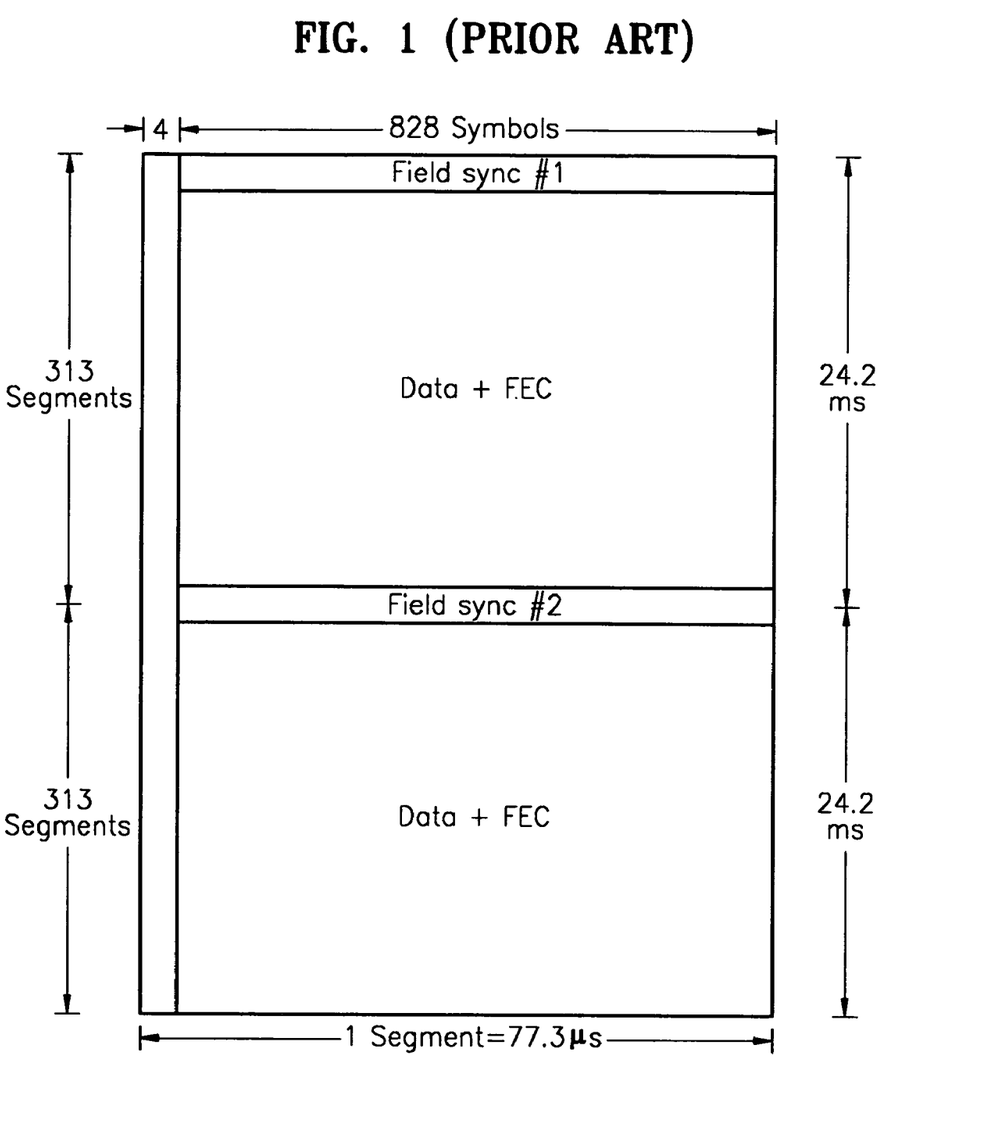
FIG. 1 illustrates a structure of a prior art vestigial side band (VSB) data frame transmitted to a digital television (DTV).
Figure 2:
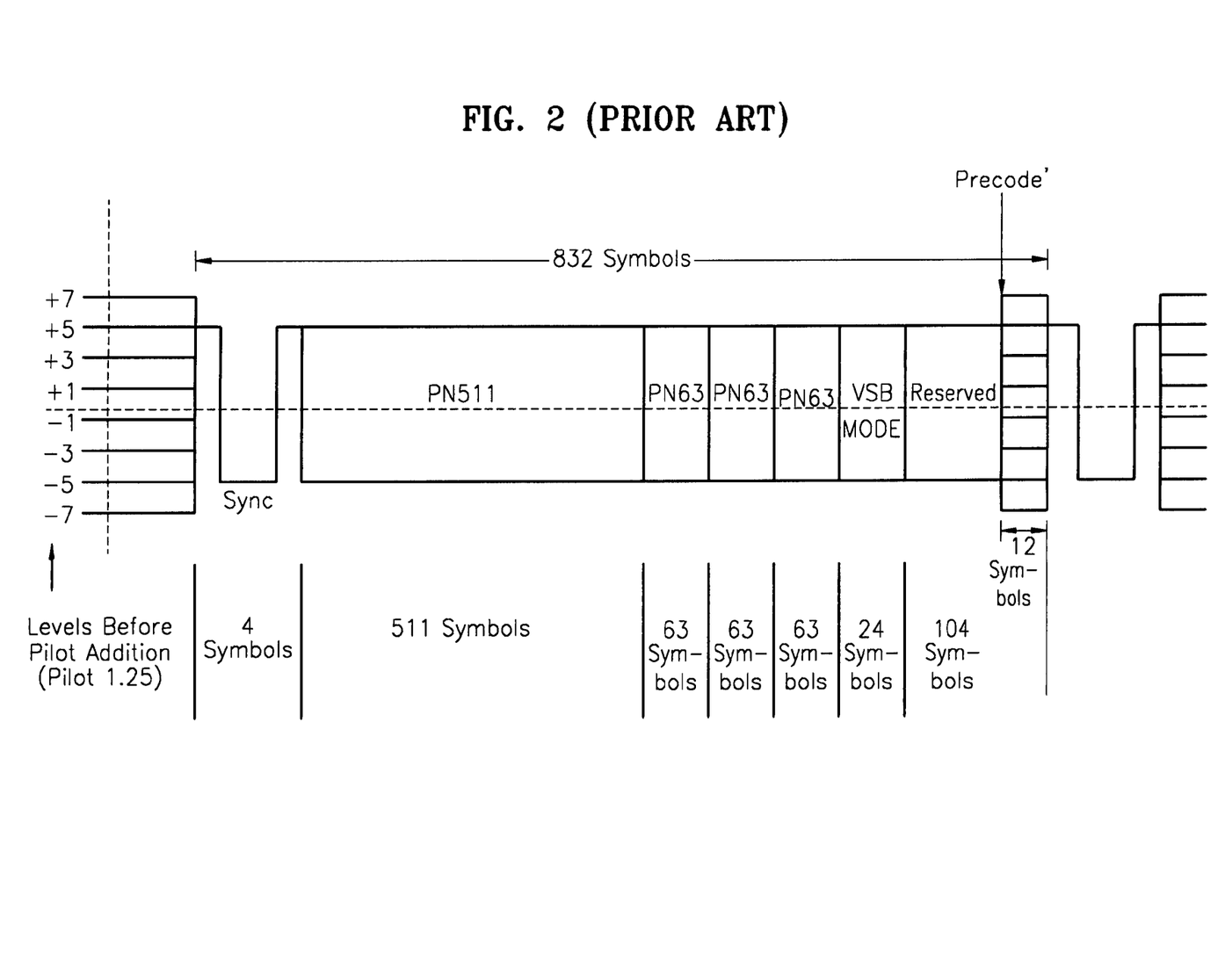
FIG. 2 illustrates a detailed structure of a field sync signal of FIG. 1.

FIG. 1 illustrates the structure of a prior art VSB data frame that is transmitted to a DTV. FIG. 2 illustrates a detailed structure of a prior art field sync signal that is shown in FIG. 1.

Referring to FIG. 1, the VSB data frame consists of two fields (Data+FEC). Each field includes 313 segments, with a first segment corresponding to a field sync signal, shown as Field sync #1 and Field synch #2. The field sync signal contains a total 832 symbols, with the first four symbols corresponding to a segment sync signal generated at levels of +5, −5, −5, and +5.

The segment sync signal indicates the beginning of each of the segments. The field sync signal this includes 828 symbols, excluding the first four symbols corresponding to the segment sync signal, for a total of 832 symbols.

The field sync signal indicates a beginning point of a data field containing data and a forward error correction (FEC), shown as Data+FEC. The field sync signal used both as a reference signal in a channel equalizer, and when determining whether an NTSC rejection filter (NRF) is required. Further, the field sync signal can be used in determining channel characteristics and loop parameters for a phase tracker.

As shown in FIG. 2, the field sync signal includes a plurality of sequences, such as a pseudo-random number (PN) 511 sequence, three PN 63 sequences, a VSB mode sequence, and a reserved sequence. The PN511 sequence is 511 symbols long and used as a training sequence for a channel equalizer.

Like the PN 511 sequence, each of the PN 63 sequences may also be used as a training sequence for a channel equalizer. The sign of the second PN sequence of the three PN 63 sequences changes whenever a field changes, thereby indicating whether a field is the first or second field of the data frame.

The VSB mode sequence is a 24 symbol-length sequence that represents a transmission mode of data currently being transmitted. That is, the VSB mode sequence indicates whether data is transmitted according to a 15-VSB transmission standard, or according to an 8-VSB transmission standard. The reserved sequence is a reserved sequence space that is 104 symbols long.

Figure 3:
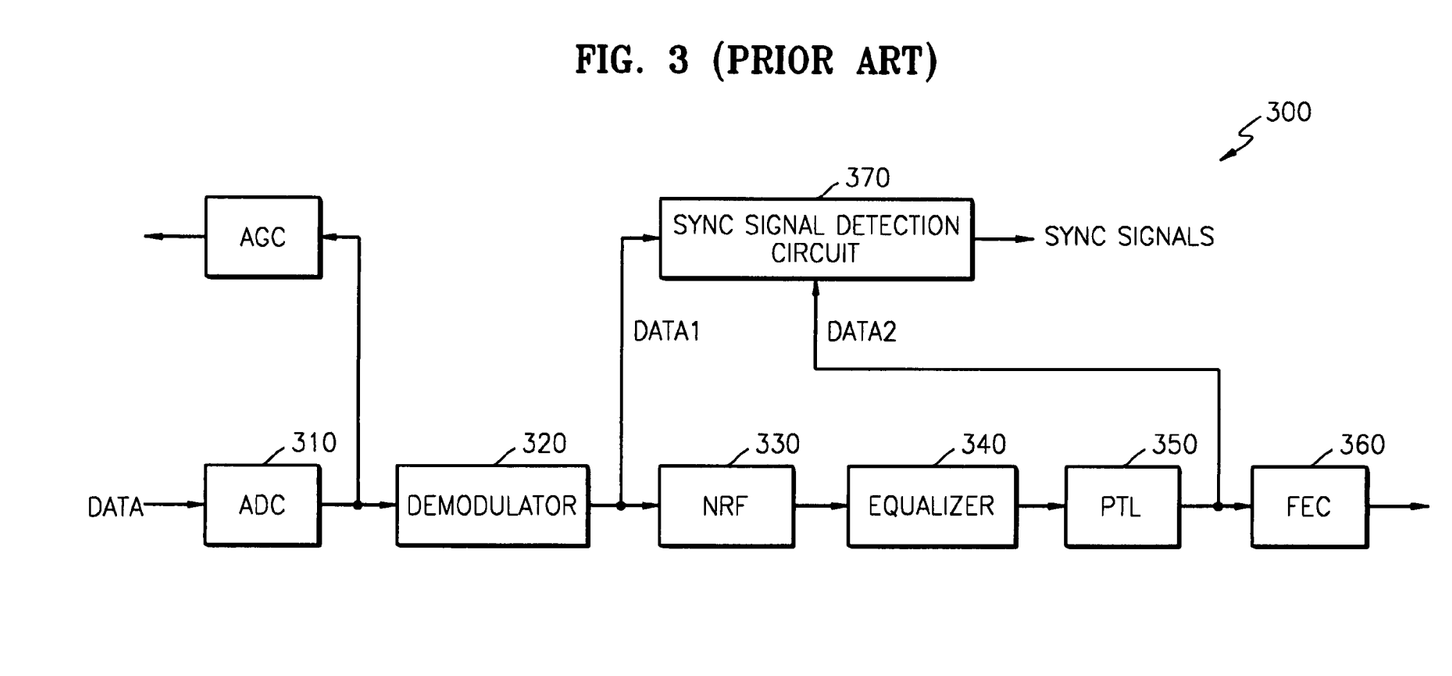
FIG. 3 is a block diagram of a prior art DTV receiver.

FIG. 3 is a block diagram of a prior art DTV receiver 300. Referring to FIG. 3, data (DATA) received by the DTV receiver 300 passes through an analog-to-digital converter (ADC) 310 to be converted into digital data. The converted digital data is input to a demodulator 320 where it is demodulated into a demodulated digital signal.

The demodulated digital signal output from the demodulator 320 is input to a phase tracking loop (PTL) 350 via an NRF 330 and an equalizer 340. The digital signal output from the PTL 350 passes through a forward error correction (FEC) unit 360 and is output from the DTV receiver 300. A sync signal detection circuit 370 detects sync signals from either a first data signal (DATA1), which is input from the demodulator 320, or from a second data signal (DATA2), which is input from the PTL 350, as shown in FIG. 3.

Figure 4:
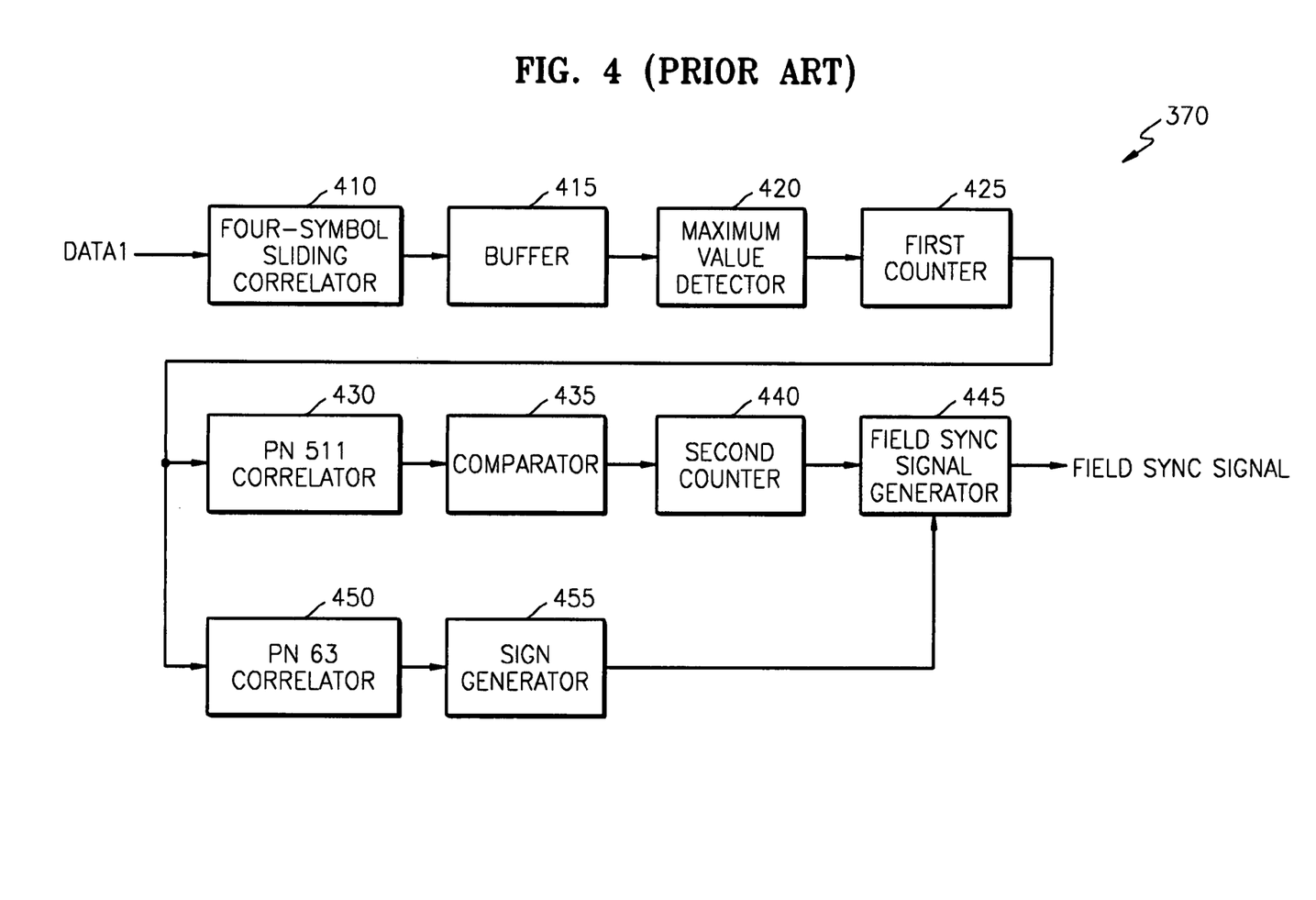
FIG. 4 is a block diagram of a synchronization (sync) signal detection circuit shown in FIG. 3.
Figure 5:
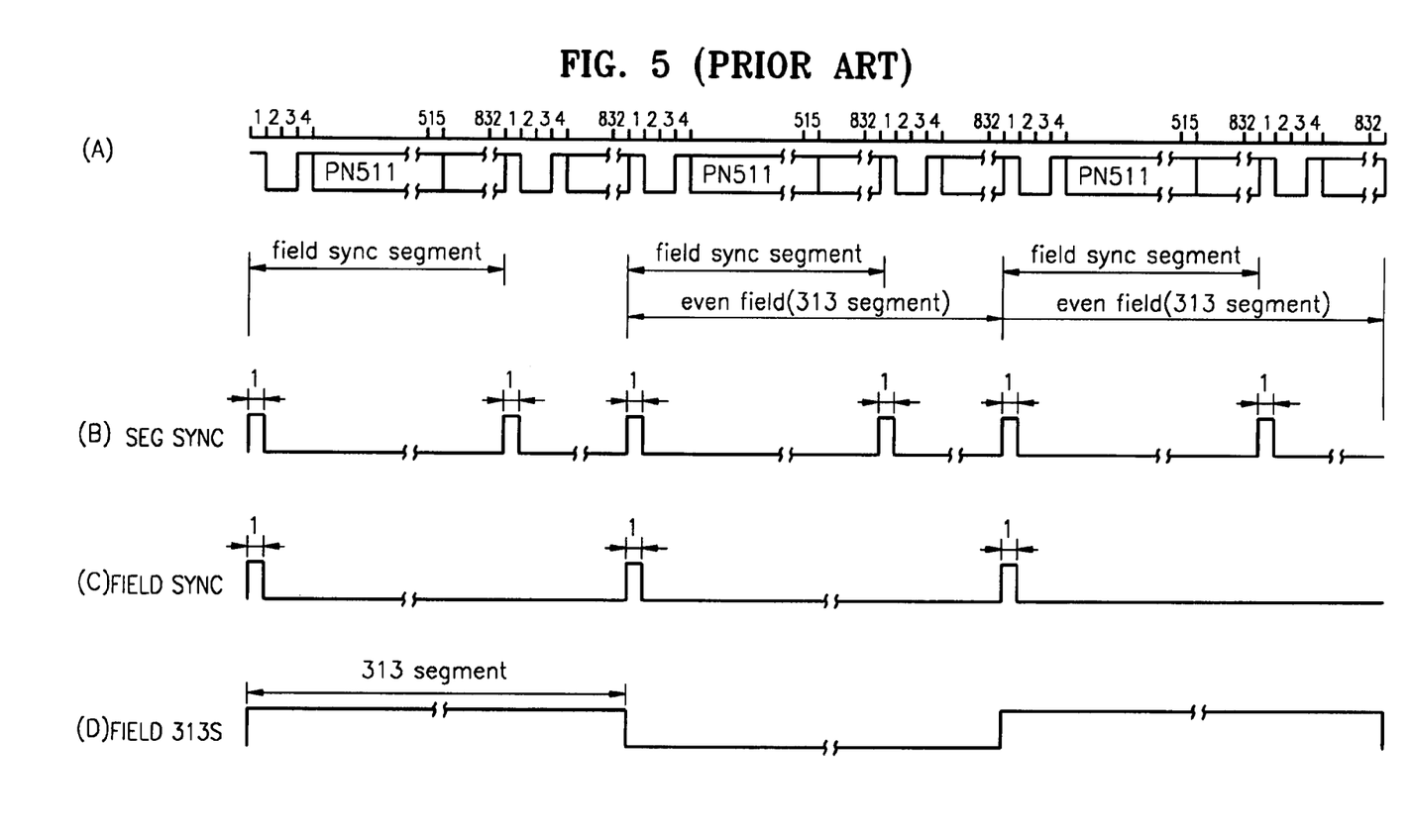
FIG. 5 is a timing diagram illustrating sync signals output from the sync signal detection circuit of FIG. 3.

FIG. 4 is a block diagram of the sync signal detection circuit 370 of FIG. 3. FIG. 5 is a timing diagram illustrating sync signals output from the sync signal detection circuit 370 of FIG. 3.

Referring to FIG. 4, the DATA1 output from the demodulator 320 of FIG. 3 is applied to a four-symbol sliding correlator 410. The four-symbol sliding correlator 410 performs a correlation operation on every four symbols of the input DATA1 and outputs correlation values to detect the position of the segment sync signal from the input DATA1.

The output correlation values are stored in a buffer 415. The buffer 415 contains the addresses of 832 symbols. The correlation value that corresponds to the location of the segment sync signal is much greater than the other correlation values, and is referred to as the 'maximum correlation value'.

Accordingly, the address of the maximum correlation value stored in buffer 415 becomes the location of a symbol where generation of the segment sync signals in DATA1 begins. The maximum correlation value is detected by a maximum value detector 420.

The maximum value detector 420 detects and outputs the address of the maximum correlation value stored in buffer 415. In other words, it is possible to determine the location of the symbol where the generation of the segment sync signal in DATA1 begins using the maximum value detector 420. A first counter 425 sets the address of the symbol in which the maximum correlation value is obtained to 0 and starts counting symbols.

After counting all 832 symbols, the first counter 425 is reset to 0. Since one segment consists of 832 symbols, the first counter 425 estimates the position of a generated segment sync signal after the segment sync signal is detected by the maximum value detector 420.

FIG. 5(A) illustrates field sync signals respectively generated for each field. FIG. 5(B) shows the timing diagram of segment sync signals. In FIG. 5(B), the beginning locations of the segment sync signals are illustrated by one-bit signals. As 313 segment sync signals exist in one field, 313 one-bit signals should thus be illustrated in FIG. 5(B). However, only a few of the 313 one-bit signals are illustrated for purposes of convenience.

When the position of the segment sync signal is determined, a PN511 correlator 430 and a PN63 correlator 450 operate to output correlation values. The PN511 correlator 430 performs a correlation operation and outputs a correlation value for each segment. A comparator 435 receives the correlation values from the PN 511 correlator 430 and compares them to a given threshold. The given threshold is a correlation value corresponding to a field sync signal.

If a correlation value output from the PN511 correlator 430 is greater than the given threshold, the position of a symbol corresponding to the correlation value becomes the position of the field sync signal. Like the first counter 425, a second counter 440 sets the position of the symbol corresponding to a correlation value that is greater than the threshold to 0 and begins counting segments.

For example, the second counter 440 counts the segments that are input to the PN511 correlator 430 and is reset to 0 after counting 313 segments. Since one field consists of 313 segments, once the 313 segments for one field have been counted, the second counter 440 estimates the position of a next field sync signal output from the comparator 435.

The PN63 correlator 450 also performs correlation operations and outputs correlation values. A sign generator 455 generates a signal for changing the sign of the field sync signal based on the correlation values output from the PN 63 correlator 450, whenever the field changes.

A field sync signal generator 445 receives information regarding the position of the field sync signal from the second counter 440 and information regarding the sign of the field sync signal from the sign generator 455 and generates the field sync signal based on the received information. In addition to the field sync signal, the field sync signal generator 445 generates sync signals with different timing characteristics.

FIG. 5(C) illustrates field sync signals respectively generated per fields. Here, initial locations of the field sync signals are indicated by one-bit signals. FIG. 5(D) shows signals output from the sign generator 455, each signal carrying information regarding the sign of a field sync signal. The signs of the field sync signals change whenever the fields change.

As described above, the prior art sync signal detection circuit 370 first determines the position of a segment sync signal, and then detects the position of a field sync signal based on the position of the segment sync signal. In general, the sync signal detection circuit 370 operates well under good channel environments such as Gaussian channel environments or Grand Alliance Ensembles channel environments. However, it is difficult for the prior art sync signal detection circuit 370 to detect the position of a segment sync signal under different channel environments of a Brazil channel. In the field of DTV, a Brazil channel is a complicated channel having various signal transmitting passes, making it difficult to detect position of a segment sync signal, for example. Accordingly, in this case, the DTV receiver 300 cannot detect a sync signal with the sync signal detection circuit 370.

SUMMARY OF THE INVENTION

An exemplary embodiment of the present invention is directed to a vestigial side band (VSB) synchronization (sync) signal detection circuit. The VSB sync detection circuit may include a data selector selecting one of a first data signal and a second data signal for output, and a PN511 sequence detector for outputting correlation values that exceed a first threshold as correlation values corresponding to a detected Pseudo-random Number (PN) 511 sequence of a VSB signal, and outputting a first control signal related to sync signal generation. A comparison buffer unit may generate a second control signal containing information regarding the position of a symbol in which a maximum correlation value is generated, and may generate a third control signal based on the result of a comparison of a next maximum correlation value to a second threshold.

In this exemplary embodiment, the VSB sync detection circuit may additionally include a sync signal position determination unit and a sync signal valid determination unit. The sync signal position determination unit receives the second control signal, determines positions of a next field sync signal and one or more segment sync signals, and generates a fourth control signal containing information regarding the position of the next field sync signal and segment sync signals based on the received second control signal. The sync signal valid determination generates at least one valid detection signal indicating that a generated field sync signal is valid based on the third control signal and fourth control signal.

In this exemplary embodiment, the VSB sync detection circuit may further include a finite state machine (FSM) that generates an internal lock signal in response to a valid detection signal, and a PN63 correlator generating a fifth control signal for determining the sign of the field sync signal. A sync signal generator may then output one or more distinct types of sync signals in response to the first control signal, the fourth control signal, the fifth control signal and the internal lock signal.

Another exemplary embodiment of the present invention is directed to a VSB synch detection circuit somewhat similar to as described in the above exemplary embodiment. However, the sync signal valid determination unit 650, and FSM 660 are not includes, and a buffer replaces the comparison buffer unit described above. Accordingly, one or more distinct types of sync signals may be generated in response to a first control signal, a position signal and a sign signal.

Another exemplary embodiment of the present invention is directed to a VSB sync signal detection circuit. The circuit may include means for generating a first control signal related to sync signal generation based on receipt of a selected one of an input first data signal and input second data signal, and means for generating a position signal containing information regarding positions of a next field sync and segment sync signals. The circuit may also include a correlator for generating a sign signal to determine a sign of the field sync signal; and a generator for generating a plurality of distinct types of sync signals based on the control signal, position signal and sign signal.

Another exemplary embodiment of the present invention is directed to a method of generating one or more VSB sync signals. In the method, one of an input first data signal and input second data signal may be selected for processing. A first control signal may be generated for driving sync signal generation based on receipt of the selected first or second data signal. A position signal may be determined, the position signal containing information regarding positions of a next field sync and segment sync signals, and a sign signal may be generated to determine a sign of the field sync signal. A plurality of distinct types of sync signals may be output based on the control signal, position signal and sign signal.

BRIEF DESCRIPTION OF THE DRAWINGS

Exemplary embodiments of the present invention will become more fully understood from the detailed description herein below and the accompanying drawings, wherein like elements are represented by like reference numerals, which are by way of illustration only and thus do not limit the exemplary embodiments of the present invention and wherein.

DETAILED DESCRIPTION OF THE EXEMPLARY EMBODIMENTS

Hereinafter, exemplary embodiments of the present invention will be described in detail with reference the accompanying drawings. The same reference numerals represent the same elements throughout the drawings.

Figure 6:
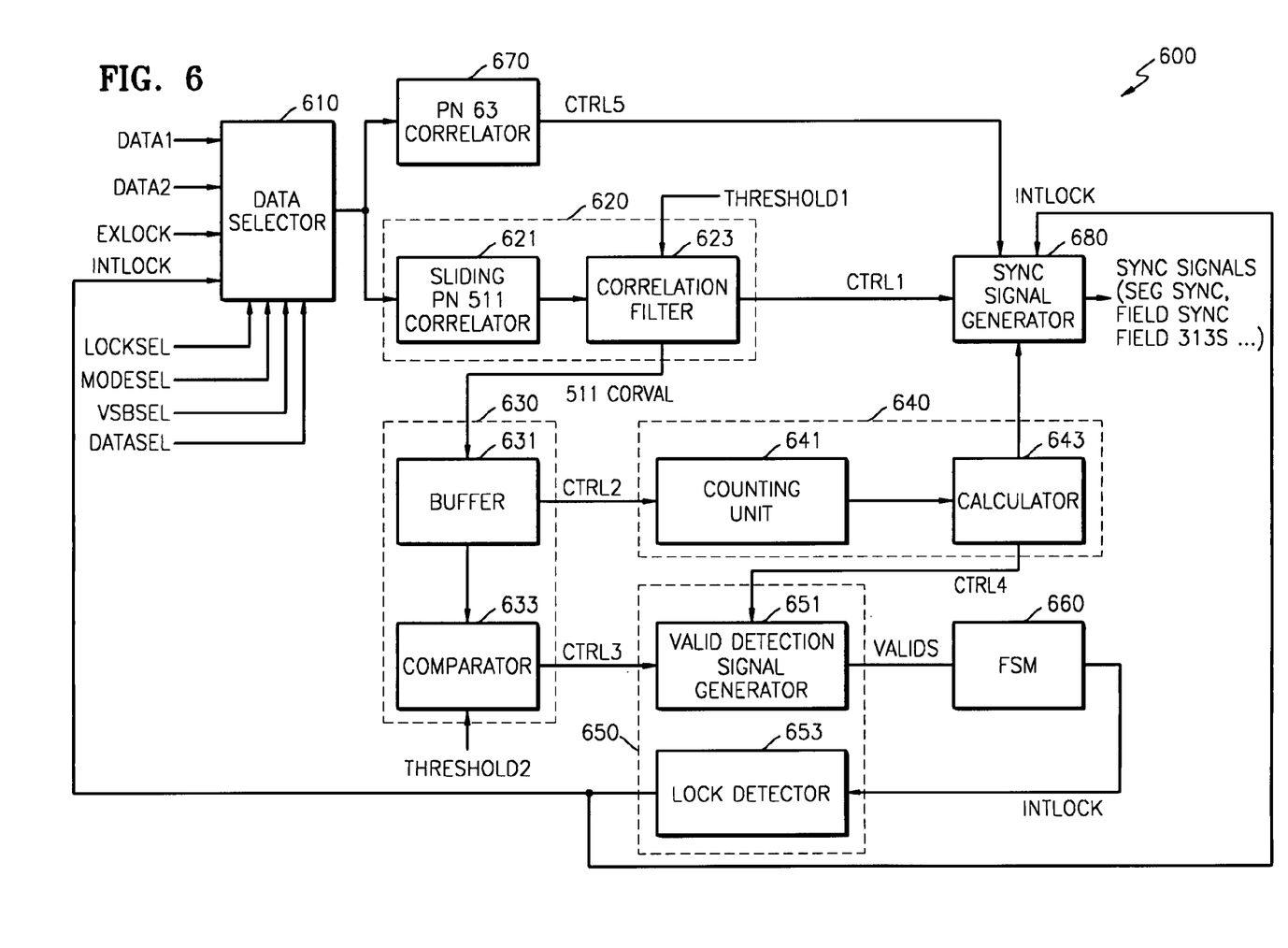
FIG. 6 is a block diagram a VSB sync signal detection circuit according to an exemplary embodiment of the present invention.

FIG. 6 is a block diagram of a vestigial side band (VSB) synchronization (sync) signal detection circuit 600 according to an exemplary embodiment of the present invention. Referring to FIG. 6, a data selector 610 selects, for output, one of first data signal (DATA1) and second data signal (DATA2), in response to a VSB level selection signal (VSBSEL), an operation mode selection signal (MODESEL), a data selection signal (DATASEL), a lock selection signal (LOCKSEL), an external lock signal (EXLOCK), and an internal lock signal (INTLOCK). The first data signal DATA1 may be received from a demodulator (not shown) and the second data signal DATA2 may be received from a phase tracking loop (not shown).

The VSB level selection signal VSBSEL enables the selection of the input DATA1 or DATA2 as a 15 VSB signal or an 8 VSB signal, for example. If the input DATA1 or DATA2 is a 15 VSB signal, the data selector 610 selects and outputs DATA1. If the input DATA1 or DATA2 is the 8 VSB signal, the data selector 610 selects and outputs either DATA1 or DATA2 based on the operation mode selection signal MODESEL.

The operation mode selection signal MODESEL enables selection of an automatic operation mode or a manual operation mode. If the automatic operation mode is selected in response to the operation mode selection signal MODESEL, the data selector 610 selects and outputs DATA1, and then selects and outputs DATA2 in response to the internal lock signal INTLOCK.

Here, the second data signal DATA2 is more reliable than the first data signal DATA1 since DATA2 is obtained by removing substantial noise from input data using an NTSC rejection filter (NRF) such as NRF 330 shown in FIG. 3, an equalizer such as equalizer 340 in FIG. 3, and a phase tracking loop (PTL) such as PTL 350, as shown in FIG. 3, for example.

During the automatic operation mode, the VSB sync signal detection circuit 600 receives the DATA1 and detects a field sync signal from the DATA1. If the field sync signal is detected and the internal lock signal INTLOCK is generated, the second data signal DATA2 becomes substantially reliable, since it has been subjected to the processes described above to remove noise. Accordingly, the field sync signal is automatically detected from the second data signal DATA2, rather than from the first data signal DATA1 by the VSB sync signal detection circuit 600.

Using the automatic operation mode may substantially ensure robustness of the operation of the VSB sync signal detection circuit 600. If the internal lock signal INTLOCK is deactivated during detection of the field sync signal using the second data DATA2, i.e., if the second data DATA2 contains substantial noise so as to make it difficult to detect the field sync signal, the data selector 610 re-selects the first data signal DATA1 for output. Thus, as a set function of the automatic mode, INTLOCK is deactivated when DATA2 has not been subject to the processes of FIG. 3 (still contains noise) and activated when DATA2 has been processed by the processes outlined in FIG. 3, for example.

Alternately, in the automatic operation mode, the DATA1 or DATA2 may be selected and output in response to the external lock signal EXLOCK rather than the internal lock signal INTLOCK. The external lock signal EXLOCK may be externally applied by a user, for example. Further, selection of the external lock signal EXLOCK or the internal lock signal INTLOCK may be determined by the lock selection signal LOCKSEL.

When the manual operation mode is selected in response to the operation mode selection signal MODESEL, either DATA1 or DATA2 may be selected and output in response to the data selection signal DATASEL. That is, in the manual operation mode, one of DATA1 and DATA2 may be manually selected by the user, so that the VSB sync signal detection circuit 600 detects the field sync signal using the DATA1 or DATA2 selected by the user, for example. For example, if the level of the DATASEL signal is high, data selector 610 may select DATA 1, and vice versa for DATA2 if the level of the DATASEL signal is low. The data selection signal DATASEL thus enables the selection of one of the first data signal DATA1 and the second data signal DATA2.

Referring to FIG. 6, a PN511 sequence detection unit 620 outputs correlation values (shown as 511 CORVAL) from among correlation values of symbols of the received DATA1 or DATA2 (selected for output to PN511 sequence detection unit 620 by data selector 610) which correspond to a Pseudo-random Number (PN) 511 sequence. Additionally, PN511 sequence detection unit 620 outputs a first control signal CTRL1, in response to a first threshold signal (THRESHOLD1) input thereto, for detection of a field sync signal (FIELD SYNC). The first threshold (THRESHOLD) may be a preset threshold representing a correlation value corresponding to a field sync signal, for example.

The PN511 sequence detection unit 620 may include a sliding PN511 correlator 621 and a correlation filter 623. The sliding PN511 correlator 621 receives the symbols of the selected DATA1 or DATA2 received from data selector 610, and generates the correlation values used for detecting the PN511 sequence.

For convenience, assume that the first data signal DATA1 was selected by data selector 610 and input to the sliding PN511 correlator 621. The sliding PN511 correlator 621 performs a correlation operation on the DATA1 to output the correlation values. A correlation value of the first data signal DATA1 that is greater than the other correlation values corresponds to the field sync signal FIELD SYNC.

The correlation filter 623 receives the first threshold (THRESHOLD1), selects those correlation values output from the sliding PN511 correlator 621 that are greater than the first threshold THRESHOLD1, and outputs the selected correlation values as the correlation values 511CORVAL corresponding to the PN511 sequence. The correlation filter 623 also generates the first control signal CTRL1. The CTRL1 signal is a control signal for driving a sync signal generator 680.

The first threshold THRESHOLD1 may be used to obtain the correlation values 511CORVAL corresponding to the PN511 sequence of the VSB signal. For example, if the maximum correlation value output from the sliding PN511 correlator 621 is less than THRESHOLD1, the maximum correlation value does not correspond to the PN511 sequence of the VSB signal.

In other words, the correlation filter 623 uses THRESHOLD1 to determine whether the first data signal DATA1 input to the sliding PN511 correlator 621 is the VSB signal. Next, the correlation filter 623 outputs correlation values that are greater than THRESHOLD1 as the correlation values 511CORVAL corresponding to the PN511 sequence of the VSB signal. These correlation values 511CORVAL are output to a comparison buffer unit 630, as shown in FIG. 6. After the 511CORVAL are output, the first control signal CTRL1 is generated, and correlation filter 623 outputs the first control signal CTRL1 to the sync signal generator 680. The first control signal CTRL1 drives the sync signal generator 680.

The comparison buffer unit 630 stores the maximum correlation value of the correlation values output from the PN511 sequence detection unit 620, and generates a second control signal CTRL2 containing information regarding the position of a symbol in which the maximum correlation value is generated. The comparison buffer unit 630 receives a second threshold THRESHOLD2, compares a next input maximum correlation value with THRESHOLD2 to determine whether the next maximum correlation value corresponds to the PN511 sequence, and generates a third control signal CTRL3 based on the result of the comparison.

The comparison buffer unit 630 may include a buffer 631 and a comparator 633. The buffer 631 receives and stores the maximum correlation value from the correlation values corresponding to the PN511 sequence, and generates the second control signal CTRL2.

For example, the buffer 631 stores the maximum correlation value among the correlation values 511CORVAL output from the correlation filter 623, detects the position of the symbol in which the maximum correlation value is generated, and generates the second control signal CTRL2. The generated second control signal CTRL2 contains information regarding the symbol position of the symbol in which the maximum correlation value is generated, and is provided to drive a sync signal position determination unit 640. The buffer 631 outputs the stored maximum correlation value to the comparator 633, and receives and stores the next maximum correlation value from the correlation values 511CORVAL received from the correlation filter 623.

The comparator 633 receives the next maximum correlation value from buffer 631, generates the third control signal CTRL3 at a first level when the next maximum correlation value is greater than THRESHOLD2, and generates the CTRL3 at a second level when the next maximum correlation value is less than THRESHOLD2.

The second threshold THRESHOLD2 is set to a given reference value so as to substantially ensure that the maximum correlation values stored in the buffer 631 are valid correlation values corresponding to the PN511 sequence. In other words, only the maximum correlation values stored in buffer 631 that are greater than a given reference value, i.e., THRESHOLD2, are regarded as valid correlation values corresponding to the PN511 sequence.

The second threshold THRESHOLD2 may be determined as a given percentage of the maximum correlation value stored in the buffer 631. For example, this given percentage may be set to 75%, although THRESHOLD2 may be set to percentages other than 75% depending on the desired application. In this example, if the next maximum value is greater than 75% of the maximum correlation value, the second maximum correlation value is thus a valid value corresponding to the PN511 sequence.

The comparator 633 thus generates the third control signal CTRL3 at the first level when the next maximum correlation value is greater than 75% of the maximum correlation value. The third control signal CTRL3 may be provided to drive a sync signal valid determination unit 650, for example. The sync signal valid determination unit 650 is driven when the third control signal CTRL3 is generated at the first level and is not driven when the third control signal CTRL3 is generated at the second level.

In FIG. 6, the sync signal position determination unit 640 determines the positions of next field sync and segment sync signals, and generates a fourth control signal CTRL4. The fourth control signal CTRL4 contains information regarding the positions of the next field sync and segment sync signals, and is generated based on the second control signal CTRL2.

The sync signal position determination unit 640 may include a counting unit 641 and a calculator 643. The counting unit 641 counts the number of symbols to determine the positions of the next field sync and segment sync signals, in response to the second control signal CTRL2. Since the second control signal CTRL2 contains the information regarding the symbol position in which the maximum correlation value is generated, the counting unit 641 sets the symbol position of the maximum correlation value to 0 and begins symbol counting.

The counting unit 641 may include a first counter (not shown) and a second counter (not shown). The first counter counts 828 symbols and is reset after the counting in response to the second control signal CTRL2, so as to determine the position of the segment sync signal. The second counter counts 313 segments and is reset after the counting in response to the second control signal CTRL2, so as to determine the position of the next field sync signal.

The calculator 643 determines the positions of the next field sync and segment sync signals, in response to an output of the counting unit 641. The position of the symbol in which the maximum correlation value is generated corresponds to the position of the symbol related to the PN511 sequence. Thus, the segment sync signal is generated at a location of a symbol that is 828 symbols away from the position of the symbol that corresponds to the previous segment sync signal.

Likewise, the next field sync signal is generated at a location of a symbol that is 313 segments away from the location of the symbol where the previous maximum correlation value is generated, i.e., from where the previous field sync signal was generated.

The calculator 643 generates the fourth control signal CTRL4 at a first level when the positions of the next field sync signal and segment sync signals are determined, and generates the fourth control signal CTRL4 at a second level otherwise.

In response to the third control signal CTRL3 and the fourth control signal CTRL4, the sync signal valid determination unit 650 generates a valid detection signal VALIDS. A detected field sync signal is determined as valid based on the levels of the third and fourth control signal CTRL3 and CTRL4.

The sync signal valid determination unit 650 may include a valid detection signal generator 651 and a lock detector 653. In response to the third control signal CTRL3 and the fourth control signal CTRL4, the valid detection signal generator 651 generates the valid detection signal VALIDS at the first level when the generated field sync signal is valid. For example, if the third and fourth control signals CTRL3 and CTRL4 are applied to the valid detection signal generator 651 at the first level, the detected position of the next field sync signal is considered to be valid. Lock detector 653 provides the INTLOCK to the data selector 610 and the sync signal generator 680, as shown in FIG. 6, for example.

For generation and maintenance of a valid field sync signal, the VSB sync signal detection circuit 600 should satisfy the following conditions. First, the second control signal CTRL2 is validly generated. In other words, the maximum correlation value should be stored in the buffer 631, the location of the symbol where the maximum correlation value is generated should be recognized, and the second control signal CTRL2 containing information regarding the symbol position should be generated. Second, the correlation values output from the sliding PN511 correlator 621 that are greater than the first threshold THRESHOLD1 should be filtered by correlation filter 623. Third, the next maximum correlation value should be greater than a given percentage of the correlation value stored in the buffer 631. The given percentage is set as the second threshold THRESHOLD2, as described above. Fourth, the position of the symbol where the next maximum correlation value is generated should be identical with a symbol position estimated by calculator 643 to be the position where the next field sync signal is generated. By satisfying these four conditions, the VSB sync signal detection circuit 600 may detect the position of a valid field sync signal using the correlation values output from the sliding PN511 correlator 621.

In addition to elements for determining that the above four conditions are satisfied, the VSB sync signal detection circuit 600 may further include a finite state machine (FSM) 660 that detects the exact position of the field sync signal.

Figure 7:
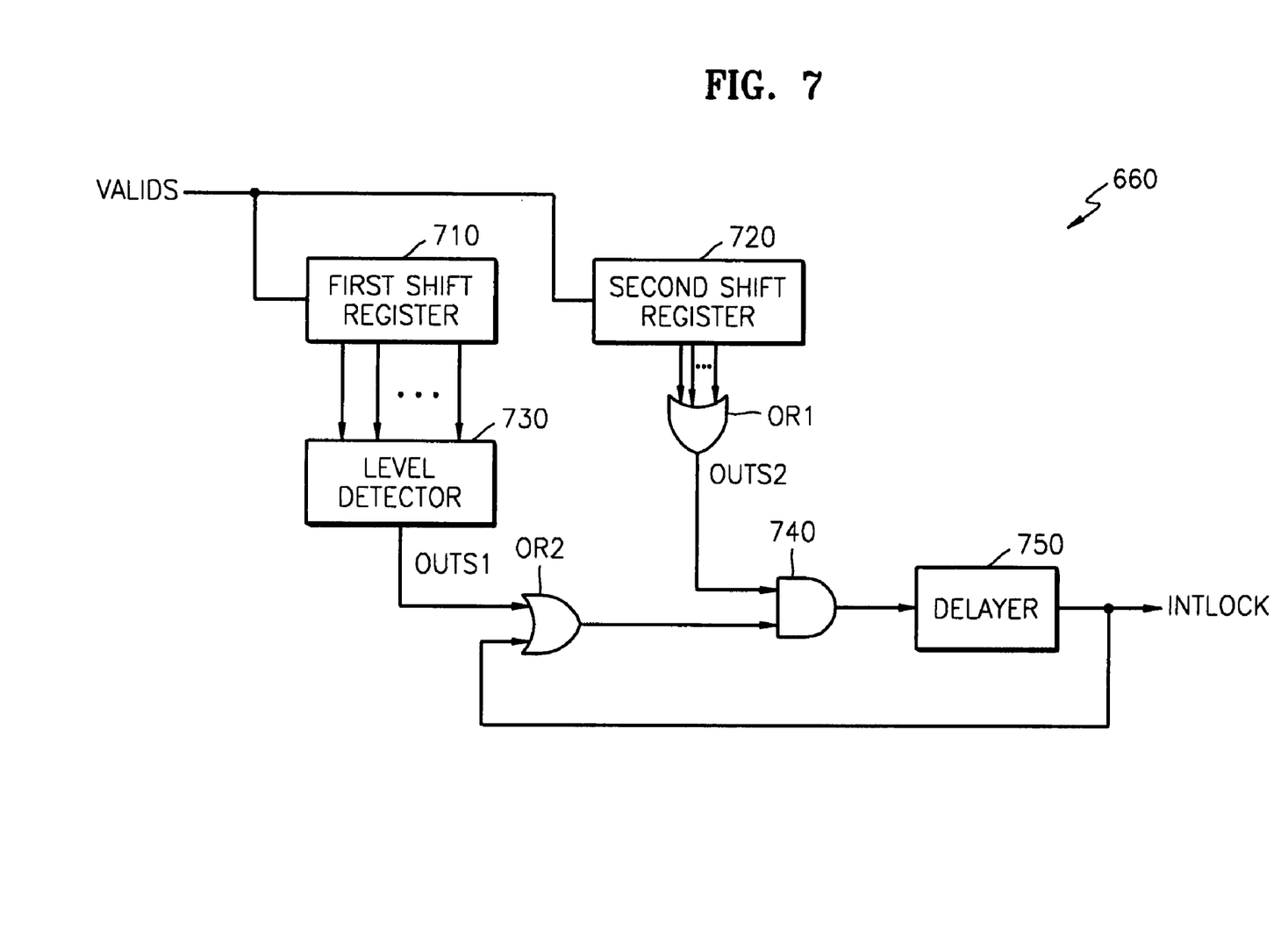
FIG. 7 is a block diagram of the finite state machine (FSM) shown in FIG. 6.

FIG. 7 is a block diagram illustrating the structure of the FSM 660 shown in FIG. 6. The FSM 660 generates the internal lock signal INTLOCK in response to the valid detection signal VALIDS, depending on whether the field sync signal is stably generated. Also, the FSM 660 stores the valid detection signals VALIDS and activates the internal lock signal INTLOCK when the number of valid detection signals VALIDS at the first level is greater than the number of valid detection signals VALIDS at the second level.

If the number of valid detection signals VALIDS at the first level is less than the number of valid detection signals VALIDS at the second level, the FSM 660 deactivates the internal lock signal INTLOCK. The valid detection signal VALIDS may be generated on a per field basis. If the valid detection signal VALIDS is generated at the first level, the position of the field sync signal may be precisely detected.

Referring to FIG. 7, the FSM 660 may include first and second shift registers 710 and 720 to receive and store the valid detection signals VALIDS. The first shift register 710 can store M valid detection signals VALIDS and the second shift register 720 can store N valid detection signals VALIDS (M and N are natural numbers), for example. Here, M and N may be the same value or different values, for example.

FSM 660 may include a level detector 730 that detects the levels of valid detection signals VALIDS stored in the first shift register 710 and generates a first output signal OUTS1 at a first level when the number of first-level valid detection signals VALIDS is greater than the number of second-level valid detection signals VALIDS.

In contrast, if the number of first-level valid detection signals VALIDS is less than the number of second-level valid detection signals VALIDS, the level detector 730 generates the first output signal OUTS1 at a second level.

Given an example where the first level is a high level and the second level is a low level, the level detector 730 operates according to a majority rule. That is, if the number of high-level valid detection signals VALIDS is greater than the number of low-level valid detection signals VALIDS, the level detector 730 generates the first output signal OUTS1 at the high level. On the other hand, if the number of low-level valid detection signals VALIDS is greater than that of the high-level valid detection signals VALIDS, the level detector 730 generates the first output signal OUTS1 at the low level.

In FIG. 7, FSM 660 includes a first OR gate OR1 that performs an OR operation on the valid detection signals VALIDS stored in the second shift register 720 and generates a second output signal OUTS2.

Given an example where both the first and second shift registers 710 and 720 can respectively store 3-bit valid detection signals VALIDS, if the valid detection signals VALIDS stored in the first and second shift registers 710 and 720 both indicate 011, the level detector 730 outputs the first output signal OUTS1 at the high level, and the first OR gate OR1 outputs the second output signal OUTS2 at the high level.

A second OR gate OR2 performs an OR operation on the internal lock signal INTLOCK and the first output signal OUTS1. Even if the internal lock signal INTLOCK is at the low level, i.e., a valid field sync signal has yet to be detected, the second OR gate OR2 outputs a signal at the high level.

An AND gate 740 performs an AND operation on the signal output from the second OR gate OR2 and the second output signal OUTS2, and outputs a high-level signal as the result of the AND operation. The high-level signal output from the AND gate 740 may be input to a delayer 750 of the FSM 660, to be generated as the internal lock signal INTLOCK. The internal lock signal INTLOCK is at the high level. In this case, a valid field sync signal is detected. The internal lock signal INTLOCK is thus output to both the lock detector 653 in sync signal valid determination unit 650, and also to the sync signal generator 680.

Given an example where the valid detection signal VALIDS for the next field is generated at the low level, the valid detection signals VALIDS stored in the first and second shift registers 710 and 720 are changed from 011 to 001. Thus, level detector 730 outputs the first output signal OUTS1 at the low level and the first OR gate OR1 outputs the second output signal OUTS2 at the high level.

The second OR gate OR2 performs an OR operation on the internal lock signal INTLOCK and the first output signal OUTS1. The first output signal OUTS1 is at the low level but the internal lock signal INTLOCK is at the high level, so that a high-level signal is output as the result of the OR operation of the second OR gate OR2.

The AND gate 740 performs an AND operation on the signal output from the second OR gate OR2 and the second output signal OUTS2 and outputs a signal at the high level as the result of the AND operation. The signal output from the AND gate 740 passes through the delayer 750 and is generated as the internal lock signal INTLOCK at the high level. Accordingly, a valid sync signal may be detected from the VSB sync signal detection circuit 600.

Given another example where the valid detection signal VALIDS for the next field is generated at the low level and the valid detection signals VALIDS stored in the first and second shift registers 710 and 720 are changed from 001 to 000, the level detector 730 outputs the first output signal OUTS1 at the low level, and the first OR gate OR1 also outputs the second output signal OUTS2 at the low level.

The second OR gate OR2 performs an OR operation on the internal lock signal INTLOCK and the first output signal OUTS1. In this case, the first output signal OUTS1 is at the low level but the internal lock signal INTLOCK is at the high level. Therefore, the second OR gate OR2 outputs a signal at the high level as the result of the OR operation.

The AND gate 740 performs an AND operation on the signal output from the second OR gate OR2 and the second output signal OUTS2 and outputs a low-level signal as the result of the AND operation. The signal output from the AND gate 740 passes through the delayer 750 and is then generated as the internal lock signal INTLOCK. Here, the internal lock signal INTLOCK is generated at the low level, and therefore, a field sync signal is not detected by the VSB sync signal detection circuit 600. Accordingly, the VSB sync signal detection circuit 600 may employ FSM 660 so as to detect the exact location of the field sync signal from data of different fields.

The VSB sync signal detection circuit 600 may include a PN63 correlator 670. The PN63 correlator 670 detects correlation values that correspond to a PN63 sequence of DATA1 (or DATA2) selected for output by the data selector 610, and outputs a fifth control signal CTRL5 for determining the sign of the field sync signal. The sign of the fifth control signal CTRL5 may change, i.e., from negative to positive or vise versa, based on whenever fields change, from one field of 313 segments to another field of 313 segments, etc.

Referring again to FIG. 6, the sync signal generator 680 outputs different sync signals in response to the first, fourth, and fifth control signals CTRL1, CTRL4, and CTRL5, and in response to the internal lock signal INTLOCK. The sync signal generator 680 is driven in response to the first control signal CTRL1.

The fourth control signal CTRL4 contains information regarding the position of field sync signal, and the fifth control signal CTRL5 contains information regarding the sign of the field sync signal. When the internal lock signal INTLOCK is activated, the sync signal generator 680 generates the field sync signal in response to the first, fourth, and fifth control signals CTRL1, CTRL4, and CTRL5.

In addition to generating the field sync signal, the sync signal generator 680 is capable of outputting the segment sync signal and other, different sync signals. If the internal lock signal INTLOCK is deactivated, the precise position of the field sync signal is thus not detected; the sync signal generator 680 therefore does not output sync signals.

The VSB sync signal detection circuit according to another exemplary embodiment of the present invention may be the same as that of the VSB sync signal detection circuit 600, except that the sync signal valid determination unit 650, the FSM 660, and the comparator 633 do not need to be included therein.

For example, the VSB sync signal detection circuit according to another exemplary embodiment may include the data selector 610, the PN511 sequence detection unit 620, the buffer 631, the sync signal position determination unit 640, the PN63 correlator 670, and the sync signal generator 680. Their operations are equivalent to those of the elements of the VSB sync signal detection circuit 600 and thus their descriptions will be omitted.

As described above, a VSB sync signal detection circuit according to the exemplary embodiments of the present invention may first detect the position of a field sync signal, and then generate different types of sync signals based on the detected position. Accordingly, it is possible to exactly detect a field sync signal, even under poor channel atmospheres such as in the Brazil channel, for example.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed is:

1. A vestigial side band (VSB) synchronization (sync) signal detection circuit, comprising:
    a data selector selecting one of a first data signal and a second data signal for output;
    a pseudo-random number 511 (PN511) sequence detector receiving the selected first or second data signal, generating a plurality of correlation values for symbols of the received first or second data signal, outputting only those correlation values that exceed a first threshold as correlation values corresponding to a detected PN511 sequence of a VSB signal, and outputting a first control signal related to sync signal generation;
    a comparison buffer unit receiving the correlation values exceeding the first threshold from the PN511 sequence detector, storing a maximum correlation value among the received correlation values, generating a second control signal containing information regarding the position of a symbol in which the maximum correlation value is generated, comparing a next maximum correlation value to a second threshold, and generating a third control signal based on the result of comparison;
    a sync signal position determination unit receiving the second control signal, determining positions of a next field sync signal and one or more segment sync signals, and generating a fourth control signal containing information regarding the positions of the next field sync signal and one or more segment sync signals based on the received second control signal;
    a sync signal valid determination unit receiving the third and fourth control signals and generating at least one valid detection signal indicating that a generated field sync signal is valid based on a level of the third control signal and a level of the fourth control signal;
    a finite state machine (FSM) that generates an internal lock signal in response to a valid detection signal, wherein the internal lock signal is fed back to the sync signal valid determination unit;
    a pseudo-random number 63 (PN63) correlator receiving the selected first or second data signal from the data selector, detecting correlation values corresponding to a PN63 sequence of the received first or second data signal, and generating a fifth control signal for determining the sign of a field sync signal; and
    a sync signal generator outputting one or more distinct types of sync signals in response to the first control signal, fourth control signal, fifth control signal, and internal lock signal.

2. The circuit of claim 1, wherein the data selector selects the first data signal or the second data signal based on one or more of a level selection signal an operation mode selection signal, a data selection signal, a lock selection signal, an external lock signal, and the internal lock signal.

3. The circuit of claim 1, wherein the PN511 sequence detector includes:
    a sliding PN511 correlator that receives the symbols of the selected first or second data signal and generates the correlation values for detecting the PN511 sequence; and
    a correlation filter that receives the first threshold, selects correlation values larger than the first threshold for output as the correlation values corresponding to the PN511 sequence, and generates the first control signal for driving the sync signal generator to generate the plurality of distinct types of sync signals;

wherein the first threshold is provided for detection of the field sync signal.

4. The circuit of claim 1, wherein the comparison buffer unit compares the next maximum correlation value to the second threshold to determine whether the next maximum correlation value is a valid correlation value corresponding to the PN511 sequence.

5. The circuit of claim 1, wherein the comparison buffer unit includes:
a buffer for storing the maximum correlation value corresponding to the PN511 sequence, and for generating the second control signal; and
a comparator generating the third control signal at a first level, if the next maximum correlation value exceeds the second threshold, or else generating the third control signal at a second level.

6. The circuit of claim 5, wherein a value of the second threshold is set to a given percentage of the maximum correlation value stored in the buffer.

7. The circuit of claim 6, wherein the given percentage is 75%.

8. The circuit of claim 1, wherein the sync signal position determination unit includes:
a counting unit that counts a number of the symbols so as to determine the positions of the next field sync and one or more segment sync signals, based on the symbol position information for the maximum correlation value contained in the second control signal; and
a calculator generating the fourth control signal at a first level, if positions of the next field sync and one or more segment sync signals are determined based on output from the counting unit, or else generating the fourth control signal at a second level.

9. The circuit of claim 8, wherein the counting unit further includes:
a first counter that counts 832 symbols to determine the position of a next segment sync signal in response to the second control signal; and
a second counter that counts 313 segments to determine the position of the next field sync signal in response to the second control signal.

10. The circuit of claim 1, wherein the sync signal valid determination unit includes:
a valid detection signal generator that generates the at least one valid detection signal at a first level if the position of the next field sync signal is validly detected based on each of the third and fourth control signals being at a first level; and
a lock detector that receives the internal lock signal from the FSM.

11. The circuit of claim 1, wherein the FSM includes:
a first shift register receiving valid detection signals;
a second shift register receiving the valid detection signals, each of the first and second shift registers storing the valid detection signals;
a level detector for detecting first levels and second levels of the valid detection signals stored in the first shift register, generating a first output signal at the first level if a number of the first-level valid detection signals is greater than a number of the second-level valid detection signals, or else generating the first output signal at the second level;

a first OR gate that performs an OR operation on the valid detection signals stored in the second shift register and outputs the second output signal as the result of the OR operation;
a second OR gate that performs an OR operation on the internal lock signal and the first output signal;
an AND gate that performs an AND operation on an output of the second OR gate and the second output signal; and
a delayer that delays an output of the AND gate to output the internal lock signal as a result of the delay.

12. The circuit of claim 1, wherein the FSM stores valid detection signals, the valid detection signals including a plurality of first-level and second-level valid detection signals, and
wherein the FSM activates the internal lock signal if a number of the first-level valid detection signals is greater than a number of the second-level valid detection signals, or else deactivates the internal lock signal.

13. The circuit of claim 1, wherein the data selector selects the first data signal for output if an input first or second data signal is a 15 VSB signal, and
wherein the data selector selects one of the first and second data signals based on an operation mode selection signal, if the input first or second data signal is an 8 VSB signal.

14. The circuit of claim 1, wherein the data selector selects the first data signal for output, and then selects the second data signal, in response to the internal lock signal, if an automatic operation mode is selected based on an operation mode selection signal, and
wherein the data selector selects one of the first and second data signals for output in response to a data selection signal, if a manual operation mode is selected based on the operation mode selection signal.

15. The circuit of claim 1, wherein the first data signal is received by the data selector from a demodulator, and
wherein the second data signal is received by the data selector from a phase tracking loop.

16. A vestigial side band (VSB) synchronization (sync) signal detection circuit, comprising:
a data selector selecting one of a first data signal and a second data signal for output;
a pseudo-random number 511 (PN511) sequence detection unit receiving the selected first or second data signal, generating a plurality of correlation values for symbols of the received first or second data signal, outputting only those correlation values that exceed a first threshold as correlation values corresponding to a detected PN511 sequence of a VSB signal, and outputting a first control signal related to sync signal generation;
a buffer unit storing a maximum correlation value among the correlation values generated by the PN511 sequence detection unit, and generating a second control signal containing information regarding a position of a symbol in which the maximum correlation value is generated;
a sync signal position determination unit receiving the second control signal, determining positions of next field sync and segment sync signals, and generating a position signal containing information regarding the positions of the next field sync and segment sync signals based on the second control signal;
a pseudo-random number 63 (PN63) correlator receiving the selected first or second data signal from the data selector, detecting correlation values that correspond to a PN63 sequence of the first or second data signal output from the data selector, and generating a sign signal for determining a sign of a field sync signal; and a sync signal generator outputting one or more distinct types of sync signals in response to the first control signal, the position signal, and the sign signal.

17. The circuit of claim 16, wherein the data selector selects the first data signal or the second data signal based on one or more of a VSB level selection signal, an operation mode selection signal, a data selection signal, and an external lock signal.

18. The circuit of claim 16, wherein the PN511 sequence detection unit includes:
   a sliding PN511 correlator that receives the symbols of the selected first or second data signal and generates the correlation values for detecting the PN511 sequence; and
   a correlation filter that receives the first threshold, selects correlation values larger than the first threshold for output as the correlation values corresponding to the PN511 sequence, and generates the first control signal for driving the sync signal generator to generate the one or more distinct types of sync signals;
   wherein the first threshold is provided for detection of the field sync signal.

19. The circuit of claim 16, wherein the sync signal position determination unit comprises:
   a counting unit that counts a number of the symbols so as to determine the positions of the next field sync and segment sync signals, based on the symbol position information for the maximum correlation value contained in the second control signal; and
   a calculator generating a fourth control signal at a first level, if positions of the next field sync and segment sync signals are determined based on output from the counting unit, or else generating the fourth control signal at a second level.

20. The circuit of claim 19, wherein the counting unit further includes:
   a first counter that counts 832 symbols to determine the position of the next segment sync signal in response to the second control signal; and
   a second counter that counts 313 segments to determine the position of the next field sync signal in response to the second control signal.

21. The circuit of claim 16, wherein the data selector selects the first data signal for output if an input first or second data signal is a 15 VSB signal, and
   wherein the data selector selects one of the first and second data signals based on an operation mode selection signal, if the input first or second data signal is an 8 VSB signal.

22. The circuit of claim 16, wherein the data selector selects the first data signal for output, and then selects the second data signal, in response to an external lock signal, if an automatic operation mode is selected based on an operation mode selection signal, and
   wherein the data selector selects one of the first and second data signals for output in response to a data selection signal, if a manual operation mode is selected based on the operation mode selection signal.

23. The circuit of claim 16, wherein the first data signal is received by the data selector from a demodulator, and
   wherein the second data signal is received by the data selector from a phase tracking loop.

24. A vestigial side band (VSB) synchronization (sync) signal detection circuit, comprising:
   means for generating a first control signal related to sync signal generation based on receipt of a selected one of an input first data signal and input second data signal;
   means for generating a position signal containing information regarding positions of next field sync and segment sync signals;
   a correlator for generating a sign signal to determine a sign of a field sync signal; and
   a generator for generating a plurality of distinct types of sync signals based on the first control signal, position signal, and sign signal;
   wherein the means for generating a first control signal includes:
      a sliding pseudo-random number 511 (PN511) correlator that receives symbols for the selected first or second data signal and generates correlation values for detecting a PN511 sequence; and
      a correlation filter that selects correlation values larger than a first threshold for output as correlation values corresponding to the PN511 sequence, and generates the first control signal for driving the generator to generate the plurality of distinct types of sync signals; and
   wherein the first threshold is provided for detection of the field sync signal.

25. The circuit of claim 24, wherein the means for generating a position signal includes:
   a buffer unit storing a maximum correlation value among the correlation values output by the correlation filter, and generating a second control signal containing information regarding the position of a symbol in which the maximum correlation value is generated; and
   a sync signal position determination unit receiving the second control signal, determining positions of next field sync and segment sync signals, and generating the position signal based on the second control signal.

26. The circuit of claim 24, wherein the first data signal is selected if the input first or second data signal is a 15 VSB signal, and
   wherein one of the first and second data signals is selected based on an operation mode selection signal, if the input first or second data signal is an 8 VSB signal.

27. The circuit of claim 24, wherein the first data signal or the second data signal is selected based on one or more of a VSB level selection signal, an operation mode selection signal, a data selection signal, and an external lock signal.

28. The circuit of claim 27, wherein the first data signal is selected prior to the second data signal, in response to the external lock signal, if an automatic operation mode is selected based on the operation mode selection signal, and
   wherein one of the first and second data signals is selected in response to the data selection signal, if a manual operation mode is selected based on the operation mode selection signal.

29. A method of generating one or more vestigial side band (VSB) synchronization (sync) signals, comprising:
   selecting one of an input first data signal and an input second data signal for processing;
   generating a first control signal for driving sync signal generation based on receipt of the selected first or second data signal;
   determining a position signal containing information regarding positions of next field sync and segment sync signals;
   generating a sign signal to determine a sign of a field sync signal; and
   outputting a plurality of distinct types of sync signals based on the first control signal, position signal, and sign signal;
   wherein selecting one of an input first data signal and an input second data signal for processing includes:

selecting the first data signal for output, if the input first or second data signal is a 15 VSB signal; and selecting one of the first and second data signals based on an operation mode selection signal, if the input first or second data signal is an 8 VSB signal.

30. The method of claim 29, wherein selecting one of an input first data signal and an input second data signal for processing includes:

selecting the first data signal or the second data signal for output based on one or more of a VSB level selection signal, an operation mode selection signal, a data selection signal, and an external lock signal.

31. The method of claim 30, wherein the first data signal is selected prior to the second data signal, in response to the external lock signal, if an automatic operation mode is selected based on the operation mode selection signal, and wherein one of the first and second data signals is selected in response to the data selection signal, if a manual operation mode is selected based on the operation mode selection signal.

\* \* \* \* \*